United States Patent [19]

Whittaker

[11] Patent Number: 4,640,993

[45] Date of Patent: Feb. 3, 1987

[54] TELEPHONE SUBSCRIBERS' CIRCUITS

[75] Inventor: Edward J. W. Whittaker, Bishops Stortford, Great Britain

[73] Assignee: International Standard Electric Corporation, New York, N.Y.

[21] Appl. No.: 747,480

[22] Filed: Jun. 21, 1985

[30] Foreign Application Priority Data

Jun. 28, 1984 [GB] United Kingdom ............... 8416414

[51] Int. Cl.⁴ .......................................... H04M 1/00
[52] U.S. Cl. ................................... 379/383; 379/361
[58] Field of Search ............... 179/81 R, 81 B, 84 R, 179/84 A, 70, 77; 364/707

[56] References Cited

U.S. PATENT DOCUMENTS 4,409,665 10/1983 Tubbs .................................. 364/707

4,488,006 12/1984 Essig et al. ......................... 179/81 R

Primary Examiner—James L. Dwyer
Attorney, Agent, or Firm—John T. O'Halloran; Thomas F. Meagher

[57] ABSTRACT

A transmission chip for a telephone subscriber's instrument can be used in a variety of modes, some of which involve use with other chips. Depending on which mode is in force, different amplifiers are used. Thus for plain ordinary telephone (POT) service, amplifiers 30, 35 and 43 are used, for loudspeaking mode amplifiers 30, 35 and 43 are used, for handsfree use amplifiers 35, 43 and 46 are used, while for VF "dialling" amplifier 46 is used. To save power, the control block (42) detects the mode in which the set is operating and, via a control bus, operates electronic switches to disable the amplifiers not needed.

1 Claim, 5 Drawing Figures

Fig.2.
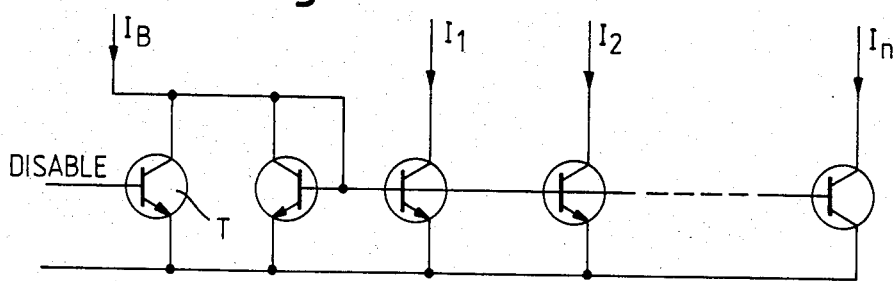
Fig.3.
| CIRCUIT | VF | OPERATIONAL DURING NORMAL TRANSMISSION | | |
|---|---|---|---|---|
| | | POT | LS | HF |
| Rx. PREAMP 43 | × | ✓ | ✓ | ✓ |
| Tx. PREAMP 30 | × | ✓ | ✓ | × |
| ELECTRET PREAMP 46 | × | × | × | ✓ |
| Tx. INPUT PIN 19 | × | ✓ | ✓ | ✓ |
| VF INPUT PIN 20 | ✓ | × | × | × |
| + 2.6 VOLT SUPPLY | ✓ | ✓ | ✓ | ✓ |
| − 1.5 VOLT SUPPLY | ✓ | ✓ | ✓ | ✓ |
| SHUNT REG. 40 | ✓ | ✓ | ✓ | ✓ |
| Rx. OUTPUT 32 | ✓ | ✓ | ✓ | ✓ |
Fig.4.
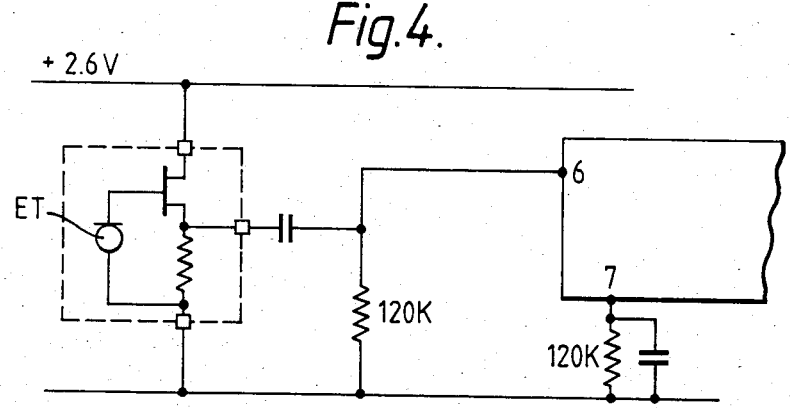

ically integrated circuit for use in a telephone subscriber's instrument — not included here as not relevant.

TELEPHONE SUBSCRIBERS' CIRCUITS

BACKGROUND OF THE INVENTION

The invention relates to electronic circuitry for use in telephone subscribers' instruments.

In our patent application P. F. Blomley et al., Ser. No. 662,487, now U.S. Pat. No. 4,608,462 (P. F. Blomley et al., Ser. No. 626,004, now abandoned) we have described a set of semiconductor chips for use in a telephone subscriber's instrument, and one of the chips described therein is usable on its own when the telephone only has to provide plain ordinary telephone (POT) service, and is usable with one or more other chips when other facilities (e.g. loudspeaking telephone) are needed. Even when used on its own the chip has a number of circuit units not all of which are in use at any one time. Hence consumption of electrical power may be rather greater than is desired. It is an object of the invention to overcome this disadvantage.

SUMMARY OF THE INVENTION

According to the invention there is provided an electrical integrated circuit for use in a telephone subscriber's instrument, which includes a plurality of circuit units each adapted for use in one or more of a plurality of different operating modes of the circuit, in which each said circuit unit is connected to the integrated circuits' power supply when in use, but is provided with an electronic switch which when enabled switches its said circuit unit off, and in which the integrated circuit includes a control unit connected to said electronic switches and responsive to signals indicative of the circuit's operating mode to enable the electronic switches for such of the circuit units as are to be switched off.

BRIEF DESCRIPTION OF THE DRAWINGS

An embodiment of the invention will now be described with reference to the accompanying drawings, in which FIG. 1(1A and 1B) is a block diagram of a semiconductor chip which embodies the invention, while FIG. 2 is a simplified circuit diagram of part of the control circuit specific to the invention, FIG. 3 is an explantory table, and FIG. 4 shows how an electret microphone can be used in the POT case.

DESCRIPTION OF THE PREFERRED EMBODIMENT

Figure 1A:
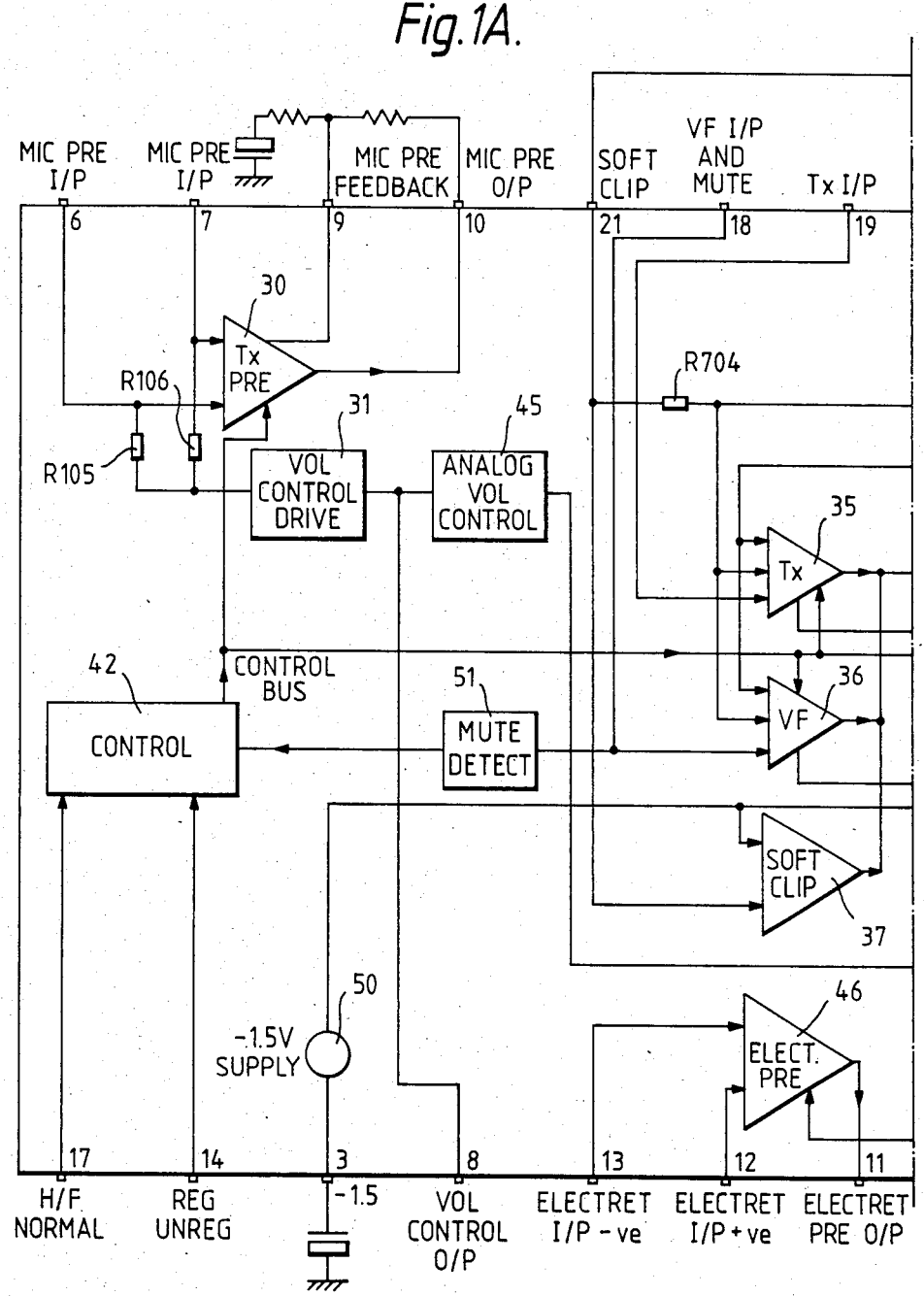

The blocK diagram, FIG. 1, shows the basic chip, usable on its own for POT service and with other chips for use in a loudspeaking or handsfree condition. This diagram is the same as the main block diagram used in the above-mentioned application. The various elements of this block diagram will now be described, but first the various connections which are made to the chip will be briefly described.

CONNECTIONS TO THE CHIP (a) The microphone is connected to pins 6 and 7, which gives a balanced input to the transmitter (microphone) pre-amplifier 30.

(b) The earpiece is connected to pins 4 and 23, pin 23 also being the signal common line.

(c) The VF generator, which is needed when multifrequency "dialling" is used, is connected to pins 18, 22 and 3. Of these, pin 18 is the VF input and mute, pin 22 is a +2.6 volt supply and pin 3 is a −1.5 volt supply. The mute function is used to disable the normal speech amplification circuitry when VF "dialling" is in progress.

(d) An electret transducer, when used, is connected via suitable external components (not shown) to pins 12 and 13. Such a transducer is available, in the POT case, as an alternative to the conventional microphone, in which case it is used in the manner indicated in FIG. 4, described later. In the handsfree case, it may be provided in addition to the conventional microphone in the handset.

(e) The telephone line is connected to pins 24 (+) and 1 (−) via suitable protection and polarity guard arrangements.

THE TRANSMIT PRE-AMPLIFIER (30)

This is optimised for low noise operation, and its input is balanced to minimise the effect of pick-up in the handset cord. The gain of this amplifier is programmable by the selection of components between the output terminal and the amplifier's feedback terminal, pin 9. Its gain is defined at least in part by the potential divider ratio of external resistors connected to the feedback pin 9, and also to the input pins 6 and 7. This enables sensitive transducers or different handsets to be used. The amplifier can drive 2 volts peak-to-peak into a 6000 ohm load, and its gain may be set between 30 and 43 dB, so that it is suitable for most moving coil transducers with impedances in the range of 300 to 600 ohms.

The pre-amplifier output appears at pin 10, which is connected, possibly via one or more external components, to the input pin 19 for the transmit amplifier.

THE RECEIVER VOLUME CONTROL SYSTEM

This system is closely associated with the transmit pre-amplifier. By pulling a balanced current out of the two microphone input pins at the resistors R105, R106, which one connected to the inputs of the pre-amplifier (30) a control current is generated by the volume control drive 31. If the volume control output pin, pin 8, is grounded via a resistor, a voltage appears at pin 8, which may be used by the handsfree control when the chip shown is used in a handsfree set. In this state, by virtue of connections (not shown), the receive output stage 32, which drives the earpiece, is set to its maximum gain state.

Alternatively, if pins 8 and 22 (+2.6 volt supply) are connected, then internal gain control is enabled. This enables the receiver gain to be reduced by any amount up to 20 dB. This pin 8 should not be left floating, since if it is, the circuit latches into an undesirable condition and can only be cleared by disconnecting the line. Maximum resistance from the microphone input pins down to ground maximises gain.

If the volume control is not used on the receive preamplifier, two resistors of value greater than 120K ohm each are connected between the receive input pins and AC ground to ensure proper biassing of the preamplifier.

THE MAIN TRANSMITTER LOOP

This includes the line output transistor 33, the emitter-collector current of which is the chip's line output, a DC amplifier 34, and either the transmitter amplifier 35 or the VF amplifier 36, depending on the state of the mute circuit. It will be recalled that when VF "dialling" is in progress, much of the speech circuitry is muted. The enablement of whichever of these two amplifiers is to be used is effected under control of the unit selection arrangement of this invention. Another circuit which is associated with the transmit stage is the soft clip amplifier 37, which only operates under high signal level conditions. The function of this soft clip arrangement is described and claimed in our U.S. Pat. No. 4,506,113 (P. F. Blomley 6).

These stages, only one of which can function at any one time, feed the driver amplifier 38, which provides base drive for the line output transistor 33. These stages are all high output impedance transconductance stages and their outputs are summed together at the input of the driver amplifier 38.

The DC amplifier 34 is energised whenever the chip is connected to the telephone line, from pin 22, +2.6 volts. An impedance $Z_t$ connected between pins 22 and 24 feeds power to the pin 22. Any AC component is filtered out by a large electrolytic capacitor connected between pins 22 and 23.

The direct potential between pins 22 and 23 is compared by the DC amplifier 34 with a voltage reference from a $V_{REF}$ source 39, and the loop of amplifiers 34-38-33 keeps the potential at pin 22 constant. Thus at DC and subsonic frequencies the impedance of the transmit output stages is very low. However, the DC characteristic of the whole chip depends on a programmable shunt regulator 40 whose output is in series with the transmitter. This regulator is described in our Application Ser. No. 746,113 (E. J. W. Whittaker 4), and will be referred to later.

The impedance of the circuit in the audio band is the parallel combination of $Z_t$, referred to above, and the internal impedance of the chip. The potential at pin 2, designated power emitter, is a measure of the current in the transmitter output stage, and the voltage on the pin 20 is due to the AC component of that current.

At any time, dependent on operational conditions as interpreted by the control block 42, either the transmit amplifier 35 or the VF amplifier 36 is enabled. Consider the case in which the amplifier 35 is enabled and the amplifier 35 is disabled. The transmit amplifier 35, although shown as a single amplifier, includes two similar amplifiers either or both of which may be enabled. Both amplifiers are connected to the TxAI/P pin 19, and both amplifier outputs are connected in parallel. The feedback input to one of these amplifiers is connected to the junction of three resistors R701, R702 and R704, which defines the low transmit gain state. The feedback input to the other transmitter amplifier is connected to the junction of the resistors R702 and R703 to give the high gain condition.

When the high gain amplifier is disabled, and in the absence of any connections from the soft clip pin 21 via R704, the output impedance in the audio band of the output stage 33 is very high and the impedance presented to the line is dominated by $Z_t$. However, pin 21 is AC coupled to the line and R704 provides positive feedback to the transmit amplifier. Thus the gain from the Tx input 19 to the +ve line 24 is given by $$\text{Gain} = \frac{Zlt\,[R701 \cdot R704 + (R702 + R703)(R704 + R701)]}{(Re \cdot R704 - R701 \cdot Zlt)(R702 + R703)}$$

where Zlt is the parallel combination of $Z_t$ and the line impedance and Re is an external resistance between pins 2 and 23.

The output impedance of the transmit stage is given by $$Zo = \frac{Zt \cdot R704 \cdot Re}{Re \cdot R704 - R701 \cdot Zt}$$

With Re at 12 ohms, R701 to R704 give the line output stage 33 an impedance of −600 ohms in the audio band. Thus if Zt is set to 300 ohms, the output impedance of the chip is 600 ohms. Since all the DC power for this chip and any other chips used with it has to come via Zt, this has the advantage of reducing the voltage drop across Zt by effectively reducing Zt.

When the low gain transmit amplifier is disabled and the high gain one is enabled, it will be seen that AC gain is increased by the ratio (R702+R703)/R703. R702 and R703 are similar resistors, so the gain increase is 6 dB. By varying the ratio of DC feed by the control circuit 42 to one of the amplifiers relative to the other, intermediate values of gain may be programmed. The output impedance of the circuit is independent of the gain setting.

These techniques are described in more detail in our U.S. Pat. No. 4,502,018 (P. F. Blomley 7).

SOFT CLIP (37)

This is described in more detail in our U.S. Pat. No. 4,506,113 (P. F. Blomley 6). It includes two stages, one of which is a rectifying detector with an accurately known dead zone. Where the AC signal on the line, received from pin 20, exceeds the limit of the dead zone, an output is generated which is proportional to the excess signal. This output current controls the transconductance of the second part of the circuit which is an amplifier whose differential inputs are ground and the junction of R701, R702 and R704. Thus when this amplifier is enabled it attempts to reduce the signal on the line.

Soft clip becomes operational when the signal on the line exceeds 3 volts peak-to-peak. Its effect is to round progressively the peaks of the output waveform, preventing any signal greater than 4.5 volts peak-to-peak from being sent to line. The output impedance of the circuit remains constant even during soft clip, which prevents deterioration of sidetone balance, return loss or Zc.

RECEIVE PRE-AMPLIFIER (43)

This amplifies the signal from the output of the sidetone network, and the associated resistors R304, R305, R306 define its gain limits. The sidetone network ensures that there is no excessive break through from the outgoing speech path into the receive speech path. As with the transmit stages, the two limits are 6 dB apart, and the gain setting is programmed by the control block 42. The maximum output capability of this pre-amplifier is 2 volts peak-to-peak into a 6000 ohm load.

RECEIVER OUTPUT STAGE (32)

This amplifies the signal from the pre-amplifier 43, which it receives via pins 15 and 5, to a sufficient level to drive a sensitive moving coil earpiece transducer whose impedance is around 300 ohm. Normally its gain is 33 dB, but using the analogue volume control 45, gain may be reduced by up to 20 dB. The peak-to-peak current output capability is 3 mA, and the peak-to-peak voltage output is 1.2 volts.

PROGRAMMABLE SHUNT REGULATOR (40)

This is in series with the transmit output stage 33, and is in parallel with a loudspeaking amplifier in an ancillary chip when such is used. It is programmed between 1.7 and 4.7 volts according to line current in the range 8 to 35 mA approximately. This means that on very long lines the output of the loudspeaker amplifier when used is curtailed, but has two advantages:

(i) it enables the DC specification of some telephone administrations to be met;

(ii) it enables two similar subscribers' sets using chips such as described herein to operate in parallel.

It also has the effect that current drawn from the +2.6 volt supply, although causing an increase in potential across the transmit stage, reduces current in the transmit stage, and hence reduces the potential across the shunt regulator 40 in the range over which it is programmable. This partially compensates for the increased drop across the transmit stage, and helps control the direct voltage of the subset under critical long line conditions.

During tone ringing, when an ancillary tone ringer chip is used, this regulator 40 is the only part of the chip which operates. It limits the voltage across the loudspeaking amplifier (on another ancillary chip) to 3.8 volts, which stabilises tone output. The overall control for the regulator 40 prevents the voltage across it from exceeding the short line voltage, even when the telephone is on-hooking or off-hooking.

ELECTRET PRE-AMPLIFIER (46)

This is configured as an operational amplifier, which enables frequency shaping to be applied to the electret transducer to match the desired response for the handsfree microphone. This amplifier 46 is suitable for gains in the range 30 to 45 dB, which may be programmed by suitable external components connected to pins 13, 12, 11. The maximum output capability of this amplifier is 2 volts peak-to-peak into a 6000 ohm load.

−1.5 VOLT SUPPLY (50)

This is a simple series regulator fed from the −ve supply, the reference used being derived from the +2.6 volt rail by a connection not shown in FIG. 1. An external electrolytic capacitor connected to pin 3 is used to provide loop stability and to prevent modulation of this supply. Current up to a maximum of 1 mA may be drawn from this supply to feed external integrated circuits such as VF tone "diallers" and microprocessors. Both this supply and the +2.6 volt supply remain fully operational down to 8 mA of line current, although excessive current demand from either of them especially under these conditions could cause deterioration of circuit performance.

MUTE DETECT AND CONTROL

The mute detect circuit 51 functions in a manner similar to a Schmitt trigger. If the potential on pin 18 falls below 40 mV, then the circuit reverts to the VF "dial" condition, while if it rises above 130 mV the circuit acts as a normal transmission integrated circuit. Between these limits, circuit hysteresis determines the circuit's state.

The mute detect circuit 51, in response to the appropriate potential on pin 18, instructs the control block 42 when VF "dialling" is needed. If it is, then the transmit amplifier 35 is disabled and the VF amplifier 36 is enabled, and all the pre-amplifiers 30, 43 and 46 are turned off over the control bus. This conserves power and minimises the line voltage of the integrated circuit. Turning off the receiver pre-amplifier 43 also provides the mute needed in the receive path.

The DC condition of the mute pin 18 has to be carefully controlled since if the resistance from pin 18 to ground is too low the circuit could latch in the VF mode if the DC bias circuit is not increased, which wastes power. If the resistance is too large the circuit may suffer from offset due to the base current of the input transistors. In one example it has been found that good results were obtained with a resistance of 10,000 ohms with a bias current of 25 microamps.

During normal operation of the circuit, the receive pre-amplifier 43 is always enabled and a choice of transmit pre-amplifier in the circuit 30 is possible via pin 17. This causes the control block 42 to appropriately set the amplifier arrangement 30. Pin 17 is pulled up to +2.6 volts internally, and if it is allowed to float it disables the electret pre-amplifier 46 and enables the transmit pre-amplifier 30. Pulling the pin down to −1.5 volts changes the powering of the pre-amplifiers, which change occurs at ground potential.

Pin 14 enables the gain regulation function for the various amplifiers to be inhibited. This regulation normally occurs between line currents of about 20 to 50 mA, and the regulation is 6 dB in transmit, receive and VF signalling. However, some administrations do not need this compensation, and by strapping this pin to pin 22, +2.6 volts, the gain regulation is inhibited, and the high gain (long line) state is selected.

POWER SAVING TECHNIQUE

Having given a general description of the chip in which the invention is embodied, we now described with reference to FIG. 2, the power saving arrangement of this invention.

Figure 1B:
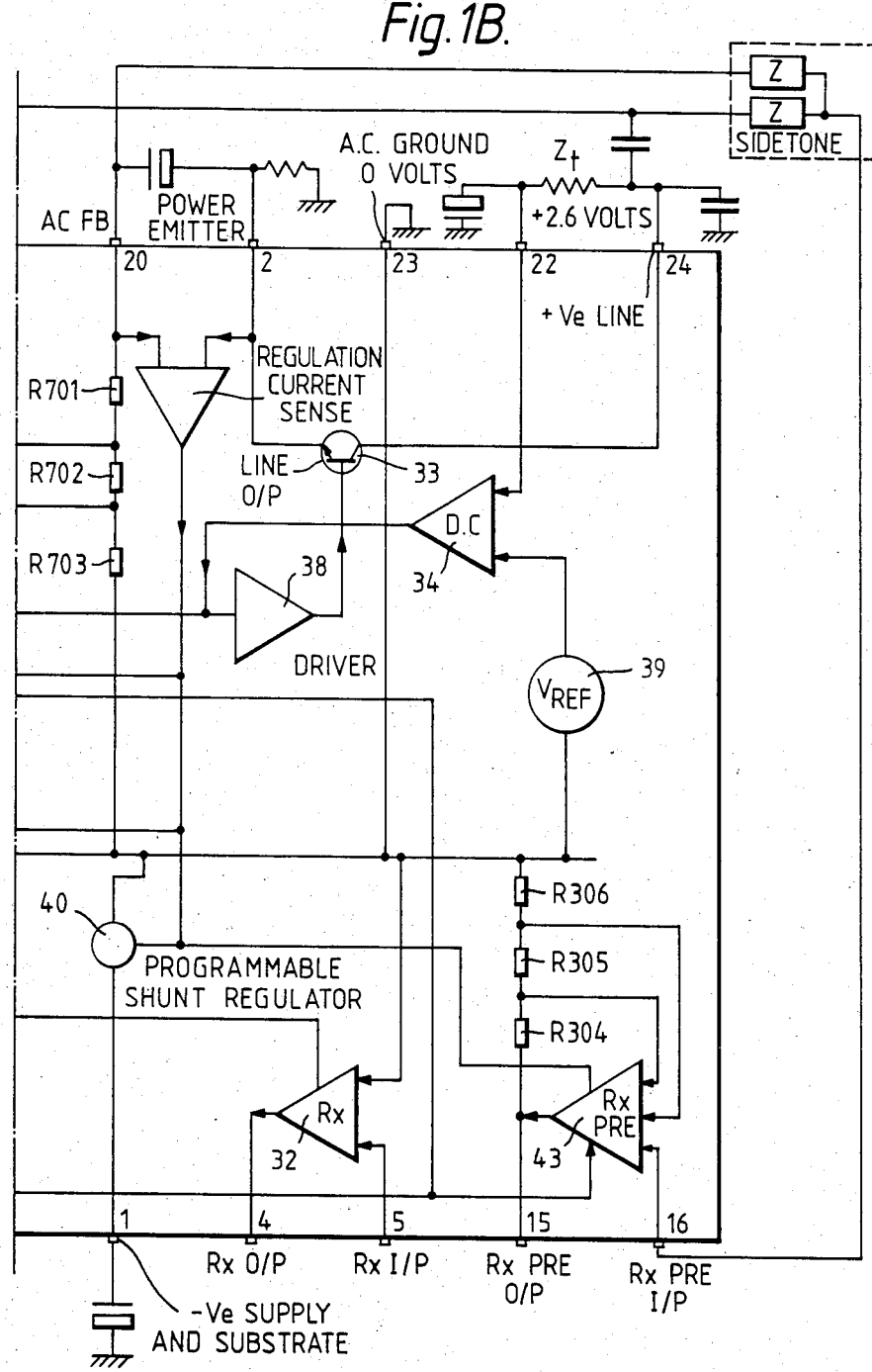

The table shown in FIG. 3 sets out a number of the units of the chip shown in FIGS. 1A and 1B, with indications as to when they are enabled.

In FIG. 3 the symbols, etc. have the following meanings:

X=Shut off    V=Switched on

VF=Voice Frequency, i.e. Dual Tone Multi-Frequency Dialling.

POT=Plain Ordinary Telephone.

LS=POT with loudspeaking function.

HF=Handsfree Telephone function.

As has been indicated above, the basic philosphy behind the control of the power to the various blocks is to reduce the "overhead" of power consumed by the chip of FIG. 1, thus making more power available for ancillary circuits, e.g. tone ringer, microprocessor, etc. and for driving the telephone line. This is particularly important at low line currents, as applies on long lines, where the total power available is restricted and excessive "on chip" power consumption would cause the line voltage of the chip to rise, perhaps out of specification. Note here that the pre-amplifiers, most of the internal circuits of the chip shown in FIGS. 1 and 2, and the ancillary chips (where used) derive power from the +2.6 volt supply. This is drawn via 300 ohms from the telephone line, as any increase in current from this supply is reflected as an increase in the voltage across the resistance, and hence in an increased line voltage.

The receive pre-amplifier 43 is needed during all normal transmission modes. During VF signalling, this is disabled to prevent any VF signal from appearing in the earpiece. However, if a "confidence tone" is required to "tell" the subscriber that something is happening, part of the tone ringer output (not shown) may be connected to the input of the receiver amplifier 32. This pre-amplifier 43 consumes a current of approximately 250 μA.

The transmit pre-amplifier 30 is needed during POT and loudspeaking operation only; it consumes about 400 μA.

The electret pre-amplifier is needed only during handsfree operation; it consumes about 250 μA.

The transmit and VF pre-amplifiers 35 and 36 only consume about 30 μA each, so power saving measures are used for them. Disabling the VF input enables the Tx input, while enabling the VF input disables the Tx input. Note that the mute function is integral with the VF input, so an out of range positive signal is interpreted as an instruction to mute the VF.

The three power supplies are needed during all modes and so are permanently operational.

The receiver amplifier 32 is powered during all modes of operation, even VF signalling, which as already stated enables a "confidence tone" to be used if desired. Since this circuit draws the majority of its power from the telephone line, and not from the +2.6 volt supply, it is not necessarily desirable to switch it off for two reasons:

(a) During VF "dialling", the only mode in which it could be disabled if "confidence tone" is not needed, the signal drive to the line is not great so power is not in short supply.

(b) The step change in current on the telephone line due to switching the receiver off, and by switching on afterwards, would put a "glitch" on the line.

FIG. 2 shows the arrangements used at each of the controlled units for switching off. For each such unit there is a transistor T which is normally disabled. There is also a current mirror arrangement with a number of current outputs $I_1, I_2 \ldots I_n$, the number n depending on the amplifier to which the circuit shown applies.

To disable the arrangement shown, transistor T is switched on by a signal on its "disable" input to its base. Hence the bias current $I_B$ for the current mirror transistor $T_m$ is diverted away from TM. Hence the output currents $I_1 \ldots I_n$ are set to zero. Note that the pre-amplifiers are always connected to the power supplies but are enabled by the appropriate bias currents. Hence cutting off these bias currents causes the desired switch off.

As already indicated, each pre-amplifier or the like has an arrangement such as shown in FIG. 2, and for each operational mode the appropriate one or more of these electronic switch arrangement is operated.

It was mentioned above that in the POT case it would be possible to use for the microphone an electret transducer. The arrangement used in this case is shown in FIG. 4, where we see an electret capsule, which includes an electret transducer ET with its own FET amplifier. This is coupled as shown to pins 6 and 7 of the chip.

I claim:

1. An electrical integrated circuit for use in a telephone subscriber's instrument, comprising; a plurality of circuit units each adapted for use in one or more of a plurality of different operating modes of the circuit, in which each said circuit unit is connected to the integrated circuits' power supply when in use, and having an electronic switch which when enabled switches its said circuit unit off, and in which the integrated circuit includes a control unit connected to said electronic switches and responsive to signals indicative of the circuit's operating mode to enable the electronic switches for such of the circuit units as are to be switched off, wherein each said electronic switch includes a current mirror arrangement with an input transistor and a plurality of output transistors, in which each said output transistor provides one of the bias currents needed to render its one of the circuit units operational, in which the electronic switch includes a normally cut-off control transistor whose emitter-collector path is connected across the emitter-collector path of the current mirror's input transistor, in which to enable the switch, to disable its said circuit unit, a signal is applied to the base of the control transistor to switch it on, and in which when the control transistor is switched on it diverts current from the input transistor of the current mirror, thus cutting off the current mirror output currents.

* * * * *